United States Patent
Niner et al.

(10) Patent No.: US 8,925,083 B2
(45) Date of Patent: Dec. 30, 2014

(54) CYBER SECURITY IN AN AUTOMOTIVE NETWORK

(71) Applicant: GM Global Technology Operations LLC, Detroit, MI (US)

(72) Inventors: Rod Niner, Royal Oak, MI (US); Mark H. Costin, Sunnyvale, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 9 days.

(21) Appl. No.: 13/644,554

(22) Filed: Oct. 4, 2012

(65) Prior Publication Data

US 2013/0104231 A1    Apr. 25, 2013

Related U.S. Application Data

(60) Provisional application No. 61/551,240, filed on Oct. 25, 2011.

(51) Int. Cl.
| | |
|---|---|
| G06F 21/00 | (2013.01) |
| G06F 11/30 | (2006.01) |
| H04L 29/08 | (2006.01) |
| H04L 12/40 | (2006.01) |
| H04L 29/06 | (2006.01) |

(52) U.S. Cl.
CPC ............... *H04L 67/12* (2013.01); *H04L 12/40* (2013.01); *H04L 63/1416* (2013.01); *H04L 63/1466* (2013.01); *H04L 2012/40273* (2013.01)
USPC .......................................................... 726/23

(58) Field of Classification Search
CPC ..... H04L 63/1416; H04L 67/12; H04L 12/40; H04L 63/1466; H04L 2012/40273
USPC .......................................................... 726/23
See application file for complete search history.

(56) References Cited

U.S. PATENT DOCUMENTS

| | | | | |
|---|---|---|---|---|
| 5,941,918 | A * | 8/1999 | Blosser | 701/31.7 |
| 7,881,215 | B1 * | 2/2011 | Daigle et al. | 370/252 |
| 2002/0133273 | A1 * | 9/2002 | Lowrey et al. | 701/29 |
| 2004/0169374 | A1 * | 9/2004 | Wurtele et al. | 290/1 A |

* cited by examiner

*Primary Examiner* — Kambiz Zand
*Assistant Examiner* — Aubrey Wyszynski
(74) *Attorney, Agent, or Firm* — Cantor Colburn LLP

(57) ABSTRACT

Preventing spoofing in an automotive network includes monitoring, by electronic control unit, data packets on a bus in the automotive network. Upon determining, in response to the monitoring, that a data packet is from a source other than the electronic control unit, the preventing spoofing in the automotive network includes generating and transmitting a diagnostic message to at least one module in the automotive network over the bus, the diagnostic message instructing the at least one module to take no action on the data packet.

18 Claims, 2 Drawing Sheets

CYBER SECURITY IN AN AUTOMOTIVE NETWORK

CROSS-REFERENCE TO RELATED APPLICATION

This application is a non-provisional application of U.S. provisional application Ser. No. 61/551,240, filed Oct. 25, 2011, the disclosure of which is incorporated by reference herein in its entirety.

FIELD OF THE INVENTION

The subject invention relates to cyber security of automotive networks and, more particularly, to preventing spoofing of messages in an automotive network.

BACKGROUND

Spoofing of messages on a vehicle data bus involves the placement of messages on the bus from a module that is pretending to be a different module with the intent to induce the vehicle to behave in a manner that is unintended by a vehicle operator. This intrusive module may send messages on the bus, and the receiving modules act on the messages, unaware of their true source. The consequences of a vehicle acting on spoofed messages can be severe.

Accordingly, it is desirable to provide a means for detecting spoofed messages in an automotive network, and preventing unintentional consequences of such spoofed messages.

SUMMARY

According to an exemplary embodiment, a method for preventing spoofing in an automotive network is provided. The method includes monitoring, by an electronic control unit, data packets on a bus in the automotive network. Upon determining, in response to the monitoring, that a data packet having an identifier is from a source other than the electronic control unit, the method includes generating and transmitting a diagnostic message to at least one module in the automotive network over the bus. The diagnostic message instructs the module to take no action on the data packet.

According to another exemplary embodiment, a system for preventing spoofing in an automotive network is provided. The system includes an electronic control unit including a computer processor. The system also includes an application executable by the computer processor. The application is configured to implement a method. The method includes monitoring data packets on a bus in the automotive network. Upon determining, in response to the monitoring, that a data packet is from a source other than the electronic control unit, the method includes generating and transmitting a diagnostic message to at least one module in the automotive network over the bus. The diagnostic message instructs the module to take no action on the data packet.

According to a further exemplary embodiment, a computer program product for preventing spoofing in an automotive network is provided. The computer program product includes a computer storage medium having instructions embodied thereon, which when executed by a computer cause the computer to implement a method. The method includes monitoring, by an electronic control unit, data packets on a bus in the automotive network. Upon determining, in response to the monitoring, that a data packet is from a source other than the electronic control unit, the method includes generating and transmitting a diagnostic message to at least one module in the automotive network over the bus. The diagnostic message instructs the module to take no action on the data packet.

In another exemplary embodiment, a method for preventing spoofing in an automotive network is provided. The method includes monitoring, by an electronic control unit, data packets on a bus in the automotive network. Upon determining, in response to the monitoring, that a data packet is from a source other than the electronic control unit, the method includes performing a dominant override of data fields or causing a network error for any message on the bus with the identifier

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses.

In accordance with an exemplary embodiment of the invention, detection and prevention of spoofing in an automotive network is provided. Automotive networks may be susceptible to hacking from outside entities. For example, controller-area network-based vehicle systems operate using a broadcast system of communication, and third-party communications can be interjected in the network by hackers who create spoofing techniques in an effort to trick a vehicle module into taking action on a spoofed message based on an assumption that the spoofed message is from an authorized vehicle module. The exemplary spoofing prevention processes described herein mitigate the effects of such spoofing techniques by monitoring messages transmitted over the vehicle network, identifying spoofed messages and generating a diagnostic message for distribution to the networked vehicle modules to ignore the spoofed message. In an alternative exemplary embodiment, the spoofing prevention processes include preventing spoofed messages or spoofing devices from reaching or accessing vehicle modules (e.g., ECUs 102) by configuring hardware components of the ECU to utilize a state-based process (e.g., a state machine) in the automotive network that instructs any module to block out unauthorized messages. For example, an ECU in the automotive network may be configured to perform a dominant override of data fields or cause a network error for any message that it sees on the network with its identifier, thus preventing the modules from responding to or using the data having the identifier of the ECU or identifier of a specific message but was sent by the unauthorized module.

Figure 1:
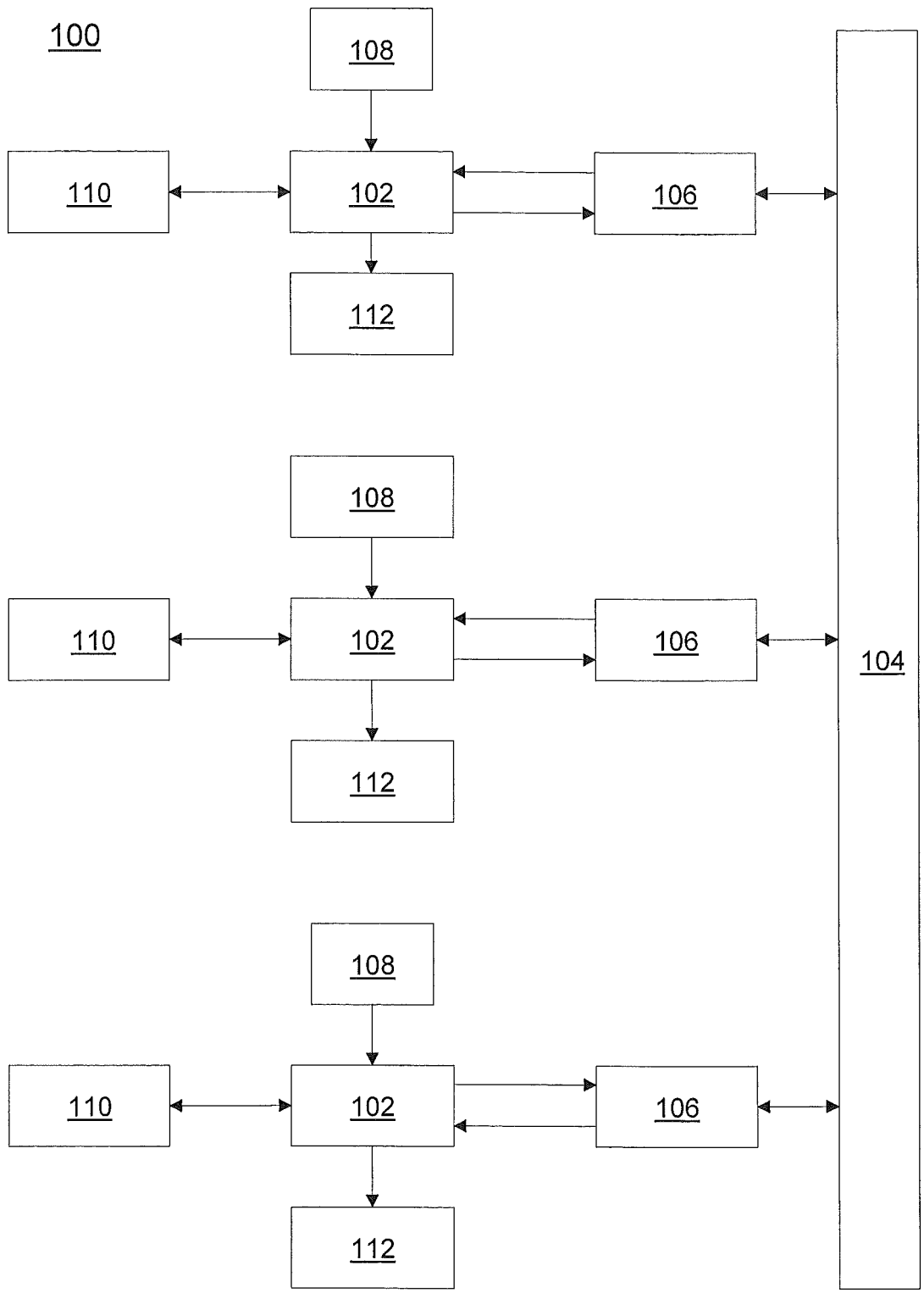
FIG. 1 is a system upon which spoofing prevention processes may be implemented in accordance with an exemplary embodiment of the invention.

Turning now to FIG. 1, a system 100 upon which spoofing prevention processes may be implemented will now be described in an exemplary embodiment. The system 100 includes electronic control units (ECUs) 102 in communication with one another over a serial data bus 104 (also referred to herein as "bus") via a transceiver 106. The bus 104 may alternatively be a parallel bus or other type of connection. The ECUs 102 may each include one or more microprocessors and memory. The ECUs 102 utilize the microprocessors to process inputs from sensors 110 (e.g., engine sensors, such as fuel injection sensors, timing devices, oxygen sensors, coolant sensors, air intake sensors, etc.), and to convey this information to vehicle components, such as other ECUs 102 or modules in the vehicle according to their respective functions, which then take action, such as driving corresponding actuators 112 that perform the vehicle functions. The sensors 110 communicate sensor data through corresponding ECUs 102 which in turn, send the data over the bus 104 via the transceiver 106. Other ECUs 102 can read messages based on the message identifier contained in the data packets that make up the message.

An ECU 102 "owns" the message itself or uses any other mechanism that allows it to know it is the only valid source of the message. As owners of the message, each ECU 102 can readily identify each message on the bus 104 that it has created. In one embodiment, the ECUs 102 each include a monitor application 108 executable thereon for monitoring its messages on the bus 104, identifying spoofed messages, and taking corrective action on the spoofed messages. In an embodiment, each ECU 102 includes a network address that is utilized in identifying the ECU 102 within the automotive network, as well as for routing packets through the network. In an alternative embodiment, an ECU 102 employs its hardware and logic circuitry to monitor the bus 104 for its own messages. If the ECU 102 determines a data packet on the bus 104 was not created by the ECU 102, the ECU 102 may stop the transmission of the message by modifying the message in order to invoke an error (or insert a null value, as will be described further herein.

The bus 104 may be implemented using any type of network configuration. For example, in one embodiment, the bus 104 may operate using standard protocols, such as controller-area network (CAN) protocols. By way of non-limiting examples, the bus 104 may be implemented as a single wire or may be two wires (e.g., twisted pair) that transmit data packets in the form of messages from one ECU 102 to another and to other desired vehicle components, or may be implemented using any number of wires (e.g., a parallel bus). The bus 104 may be implemented in a multiplexed wiring fashion in which specified microprocessors consolidate inputs and outputs from multiple sources within a designated area of the vehicle (e.g., driver side door section including power window, power locks, driver side side-view mirror, etc.). In other non-limiting examples, the bus 104 may be implemented using coaxiable cable or fiber optic cable, or may be implemented wirelessly using radio frequency signaling. It will be understood that the bus 104 may be implemented using any network topology known in the art, such as star, linear, ring, mesh, etc. The ECUs 102, transceiver 106, and bus 104 form part of an automotive network on a vehicle.

The microprocessors of the ECUs 102 and other networked modules in the vehicle may include hardware elements (e.g., circuitry, logic cores, registers, etc.) for processing data configured to facilitate operation of the various components of the vehicle, such as the fluid mix, ignition timing, and air flow, to name a few. The microprocessors of the ECUs 102 execute the monitor application 108 as will be described herein.

The transceivers 106 facilitate communications among the ECUs 102 and other vehicle components. The transceivers 106 listen for, and place messages on, the bus 104, as well as buffer and convert electrical signals on the bus side to logic-level signals needed for the ECUs 102 on the ECU side. The functions performed by the transceivers 106, as described herein, are directed to a CAN network; however, it will be understood that the embodiments are not so limited.

One or more of the ECUs 102 may be communicatively coupled to communications components (not shown) that coordinate traffic data between the vehicle's automotive network and external network devices, e.g., cellular telephone networks, satellite systems, telematics providers, etc.

As indicated above, in another embodiment, the spoofing prevention processes include preventing spoofed messages or spoofing devices from reaching or accessing vehicle modules (e.g., ECUs 102) by configuring hardware components of the ECUs 102 in the automotive network to instruct any module to block out certain messages. For example, upon determining a message on the network contains its identifier or an identifier of the message owned by the ECU, but the message was not created by the ECU 102, the ECU 102 may be configured to perform a dominant override of data fields in the message or cause a network error for any message that it sees on the bus 104 with its identifier, thus preventing the modules from responding to or using the data sent by the unauthorized module. This approach relies on a state machine and a proposition that one logic state (a dominant state) wins over the other logic state (a recessive state). The logic circuitry of the ECU 102 identifies a data packet and determines it contains a valid ECU 102 identifier but the ECU 102 did not send the message. The ECU 102 then changes the remaining serial stream of the message to a state that other ECUs 102 will recognize as an error state or benign value. For example, in a CAN network, there are specific bit patterns that are known to be invalid. If one ECU 102 holds the bus 104 in a dominant state for an extended period of time, other ECUs 102 will not continue to transmit their messages on the bus 104. The automotive network is configured to tolerate this situation given that some alternatives may provide undue risk to certain module's functionality (e.g., holding the bus 104 in a dominant rogue command from an unauthorized message).

Figure 2:
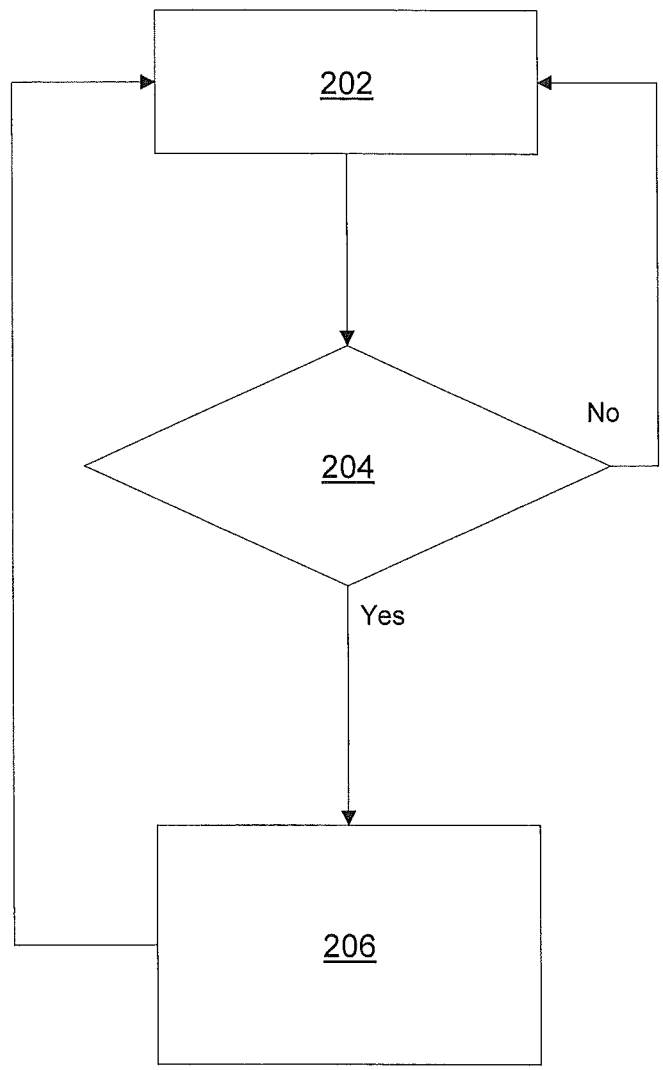
FIG. 2 is a flow diagram describing a process for preventing spoofing of messages on an automotive network in accordance with an exemplary embodiment.

Turning now to FIG. 2, a process for preventing spoofing in an automotive network will now be described in an embodiment. At step 202, an ECU's monitor application 108 monitors network packets on the bus 104. The packets form part of a message that provides information to one or more vehicle components. For example, a packet includes a header that identifies the packet (e.g., the packet is a speed reading from a sensor or a temperature reading from another sensor). The packet also includes data which includes the value of the reading (e.g., temperature of 102 degrees). The monitor application 108 may be configured to monitor packets having only the identifiers associated with the packets created and transmitted by the ECU 102 via which it is executing (i.e., monitoring its own generated messages). At step 204, it is determined whether a packet of a monitored packet has the identifier associated with the ECU 102 but is determined to have been created by a source other than the ECU 102. If the packet is determined to have been created by the ECU 102, the process returns to step 202 and the monitoring continues. In this scenario, the packet is transmitted through the network as instructed in the routing information. Otherwise, if the packet is determined to be from a source other than the ECU 102, the monitor application 108 is configured to generate and transmit a diagnostic message instructing other ECUs 102 to ignore (i.e., not act on or respond to) the packet at step 206. The process may then return to step 202 in which the ECU 102 continues to monitor the traffic on the bus 104.

As indicated above, an alternative exemplary embodiment includes configuring hardware components of the ECUs 102 to prevent spoofed messages or spoofing devices from reaching or accessing vehicle modules (e.g., ECUs 102) whereby the respective ECU 102 instructs any modules to block out messages. For example, the ECU 102 may perform a dominant override of data fields or cause a network error or benign message for any message that it sees on the bus 104 with its identifier (but was not created by the ECU 102), thus preventing the modules from responding to or using the data sent by the unauthorized module. For example, the ECU 102 monitoring its messages on the bus 104 identifies a message having its identifier and determines the message was not created by the ECU 102. As the data stream of the message is transmitted serially, the ECU 102 detects the identifier first and uses dominant bits to override the remaining portion of the message, thus causing the message to be interpreted as an error or benign message (i.e., no action) by all other ECUs 102. By contrast, when the monitor application 108 is utilized, the message continues its transmission over the bus 104 and the monitor application 108 sends another message on the bus 104 instructing the other ECUs 102 to ignore the message.

Technical effects of the embodiments provide detection and prevention of spoofing in an automotive network. The embodiments mitigate the effects of such spoofing techniques by monitoring messages transmitted over the vehicle network, identifying spoofed messages and generating a diagnostic message for distribution to the networked vehicle modules to ignore the spoofed message. Alternative embodiments include preventing spoofed messages or spoofing devices from reaching or accessing vehicle modules by configuring hardware components of an electronic control unit to utilize a state-based process in the automotive network that instructs any module to block out or neutralize unauthorized messages.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. A method for preventing spoofing in an automotive network, the method comprising:
    tracking, by an electronic control unit of a vehicle, at least one message created by the electronic control unit and transmitted on a bus in the automotive network, the at least one message forming one of a plurality of messages transmitted among a plurality of electronic control units on the bus, the electronic control unit assigned a unique identifier;
    monitoring, by the electronic control unit, data packets of the plurality of messages, each of the data packets including an identifier of a corresponding electronic control unit based on a routing plan; and
    upon determining by the electronic control unit, in response to the monitoring, that an identifier contained in at least one of the data packets matches the unique identifier assigned to the electronic control unit and that the electronic control unit, responsive to the tracking, is not the creator of the at least one of the data packets, generating and transmitting a diagnostic message to at least one module in the automotive network over the bus, the diagnostic message instructing the at least one module to take no action on the at least one of the data packets.

2. The method of claim 1, wherein the data packets are transmitted in response to a sensor reading and contain sensor reading data.

3. The method of claim 1, wherein the monitoring is performed by an application executable by a processor of the electronic control unit.

4. The method of claim 1, wherein the at least one of the data packets that is not created by the electronic control unit is received from a source that is external to the automotive network.

5. The method of claim 1, wherein the automotive network is a wireless network.

6. The method of claim 1, wherein the plurality of messages are transmitted over the automotive network via transceivers of corresponding electronic control units.

7. The method of claim 1, wherein a message containing the at least one of the data packets that is not created by the electronic control unit is a spoofed message.

8. A system for preventing spoofing in an automotive network, comprising:
    an electronic control unit including a computer processor; and
    an application executable by the computer processor, the application configured to implement:
    tracking at least one message created by the electronic control unit and transmitted on a bus in the automotive network, the at least one message forming one of a plurality of messages transmitted among a plurality of electronic control units on the bus, the electronic control unit assigned a unique identifier;
    monitoring data packets of the plurality of messages, each of the data packets including an identifier of a corresponding electronic control unit based on a routing plan; and
    upon determining, in response to the monitoring, that an identifier contained in the at least one of the data packets matches the unique identifier assigned to the electronic control unit and that the electronic control unit, responsive to the tracking, is not the creator of the at least one of the data packets, generating and transmitting a diagnostic message to at least one module in the automotive network over the bus, the diagnostic message instructing the at least one module to take no action on the at least one of the data packets.

9. The system of claim 8, wherein the data packets are transmitted in response to a sensor reading and contain sensor reading data.

10. The system of claim 8, wherein the at least one of the data packets that is not created by the electronic control unit is received from a source that is external to the automotive network.

11. The system of claim 8, wherein the automotive network is a wireless network.

12. The system of claim 8, wherein the plurality of messages are transmitted over the automotive network via transceivers of corresponding electronic control units.

13. A computer program product for preventing spoofing in an automotive network, the computer program product comprising a non-transitory computer storage medium having instructions embodied thereon, which when executed by a processor of an electronic control unit cause the electronic control unit to implement:

tracking at least one message created by the electronic control unit and transmitted on a bus in the automotive network, the at least one message forming one of a plurality of messages transmitted among a plurality of electronic control units on the bus, the electronic control unit assigned a unique identifier;

monitoring data packets of the plurality of messages, each of the data packets including an identifier of a corresponding electronic control unit based on a routing plan; and upon determining, in response to the monitoring, that an identifier contained in the at least one of the data packets matches the unique identifier assigned to the electronic control unit and that the electronic control unit, responsive to the tracking, is not the creator of the at least one of the data packets, generating and transmitting a diagnostic message to at least one module in the automotive network over the bus, the diagnostic message instructing the at least one module to take no action on the at least one of the data packets.

14. The computer program product of claim 13, wherein the data packets are transmitted in response to a sensor reading and contain sensor reading data.

15. The computer program product of claim 13, wherein the at least one of the data packets that is not created by the electronic control unit is received from a source that is external to the automotive network.

16. The computer program product of claim 13, wherein the automotive network is a controller-area network.

17. The computer program product of claim 13, wherein the plurality of messages are transmitted over the automotive network via a transceivers of corresponding electronic control units.

18. A method for preventing spoofing in an automotive network, the method comprising:

tracking, by an electronic control unit of a vehicle, at least one message created by the electronic control unit and transmitted on a bus in the automotive network, the at least one message forming one of a plurality of messages transmitted among a plurality of electronic control units on the bus, the electronic control unit assigned a unique identifier;

monitoring, by the electronic control unit, data packets of the plurality of messages, each of the data packets including an identifier of a corresponding electronic control unit based on a routing plan; and upon determining by the electronic control unit, in response to the monitoring, that an identifier contained in at least one of the data packets matches the unique identifier assigned to the electronic control unit and that the electronic control unit, responsive to the tracking, is not the creator of the at least one of the data packets, performing a dominant override of data fields in the at least one of the data packets using a dominant state and a recessive state of a state machine implemented by the electronic control unit.

* * * * *